United States Patent [19]

Takao et al.

[11] Patent Number: 5,788,759
[45] Date of Patent: Aug. 4, 1998

[54] δ-INDANTHRONE BLUE PIGMENT AND MANUFACTURING METHOD THEREFOR

[75] Inventors: Nagayuki Takao, Ryugasaki; Isao Oshiumi; Kiyomi Kitami, both of Katori-gun, all of Japan

[73] Assignee: Dainippon Ink and Chemicals, Inc., Tokyo, Japan

[21] Appl. No.: 615,199

[22] PCT Filed: Aug. 15, 1995

[86] PCT No.: PCT/JP95/01624

§ 371 Date: Apr. 12, 1996

§ 102(e) Date: Apr. 12, 1996

[87] PCT Pub. No.: WO96/05255

PCT Pub. Date: Feb. 22, 1996

[30] Foreign Application Priority Data

Aug. 15, 1994 [JP] Japan ................... 6-191498

[51] Int. Cl.$^6$ ................... C08K 5/00
[52] U.S. Cl. ................... 106/498; 106/400; 106/401; 544/339; 544/340
[58] Field of Search ................... 106/498, 400, 106/401; 544/339, 340

[56] References Cited

U.S. PATENT DOCUMENTS 4,167,634  9/1979  Hoch et al. ................... 544/339

FOREIGN PATENT DOCUMENTS

| 0 014 458 | 8/1980 | European Pat. Off. . |
| 2379582 | 9/1978 | France . |
| 886 734 | 8/1953 | Germany . |
| 27 05 107 | 8/1978 | Germany . |
| 28 54 190 | 3/1980 | Germany . |
| 46-1707 | 1/1971 | Japan . |
| 53-98334 | 8/1978 | Japan . |

OTHER PUBLICATIONS

"Chemical Abstracts", vol. 93, Abstract No. 48538 of DE 2854190, Mar. 1980.

Derwent Abstract, "WPIDS", No. 80–23803C of DE 2854190, Mar. 1980.

Primary Examiner—Mark L. Bell
Assistant Examiner—Scott L. Hertzog
Attorney, Agent, or Firm—Armstrong,Westerman, Hattori, McLeland & Naughton

[57] ABSTRACT

A δ-indanthrone blue pigment having an average primary particle diameter in the range of 0.5 μm or less and having a chroma C* value of 20 or greater; a hue angle in the range of 274–283 when colorimetry is performed on a paint film made from a melamine alkyd paint in which the proportion of pigment in the solid portion is 9.6%; and containing δ-indanthrone blue pigment and titanium dioxide pigment in a ratio of 1 to 20 by weight.

16 Claims, 4 Drawing Sheets

δ-INDANTHRONE BLUE PIGMENT AND MANUFACTURING METHOD THEREFOR

BACKGROUND OF THE INVENTION

1. Field of the Invention

The present invention relates to a δ-indanthrone blue pigment which exhibits a more reddish blue color than α-indanthrone blue pigment and to a manufacturing method thereof.

2. Description of the Related Art

According to PB Report 85172 and THE JOURNAL OF JAPAN SOCIETY OF COLOUR MATERIAL (Vol 43, pp 560–561, 1979) which introduced the contents of the PB Report, there are 4 types of crystal form known for indanthrones, α, β, γ, and δ. These indanthrones are used as dye stuffs, and their crystalline properties have only been of secondary importance. In addition, it is reported that, of these crystalline forms, α is the most stable crystal form, the others are reported to change crystal form to α when heated to 250° C. δ-indanthrone is made by dissolving indanthrone in concentrated sulfuric acid and then slowly adding water. In addition, it is stated that its particle diameter is large, and that its color is greenish gray.

In addition, it is stated in Japanese Patent Application, First Publication, Sho. 53-98334 that indanthrone exists in 4 polymorphic crystal forms called α-, β-, γ-, and δ-transformations; α- and β- crystal forms give a blue coloring which has a greenish tone; γ-crystal form gives a blue coloring which has a reddish tone; and δ-crystal form has no value from the point of view of color. Furthermore, it is stated that, within the indanthrone crystal forms, the α-form is the most stable, and, for this reason, it is good for use as a pigment for coloring varnish and composition resins; and that the γ-form is obtained by oxidizing leuco indanthrone at 50° C., and then the filtration residue is dried carefully in a vacuum.

The α-indanthrone blue pigment, as a beautiful reddish blue pigment is used mainly in the automobile paint field because it gives a reddish blue color of high weather resistance that copper phthalocyanine cannot satisfactorily possess.

However, α-indanthrone blue pigment has a problem for coloring such as flip-flop phenomenon, for example, when α-indanthrone blue pigment is used in metallic paint for automobile use, when observed from a vertical angle to the paint panel, it looks reddish blue but it is on the greenish side, in the reddish blue range the reddishness is not strong, in contrast, when the metallic paint panel is observed from the bottom angle, the reddishness appears strong. This problem can be improved by making the particles of α-indanthrone blue pigment smaller, however, the hue becomes even greener causing a new problem.

Because the hue of β-indanthrone blue pigment has about the same degree of reddish blue color as the α-indanthrone blue pigment, it has no value over α-indanthrone blue pigment, and, in addition, it has a problem of being unstable as a pigment.

The γ-indanthrone blue pigment exhibits a more reddish blue color than α-indanthrone blue, but, because it is unstable in terms of its crystal properties, a stable pigment cannot be obtained.

The above-mentioned public literature has a description to the effect that δ-indanthrone blue has no value from the point of coloring as a pigment, and also among pigment manufacturers, δ-indanthrone blue is considered to have no value from the point of view of color. In addition, δ-indanthrone lacks stability as a coloring material because it has an unstable crystal form, and when used as a paint, it was thought to cause problems such as heat discoloration, and discoloration over time.

For this reason, it has not been possible to make a tone of strong reddish blue color except by employing, for example, a method of mixing blue pigments of phthalocyanine with other violet pigments, or red pigments.

Furthermore, methods which use pigments of different chemical structure together have not been able to provide colors which can satisfy the various problems such as inferiority in coloring strength, transparency, etc.; the production of muddiness in colors; the production of color separation; poor weather resistance; and big flip flop phenomenon.

SUMMARY OF THE INVENTION

The object of the present invention is to provide pigment which exhibits a more reddish blue hue, with high chroma and is superior in dispersability, weather resistance, and crystalline stability.

The inventors, to solve the above object, when searching for the relationship between redness and crystal particle diameter size for α-indanthrone blue pigment, while preparing α-indanthrone pigments which differ in particle diameter by a method in which oxidizing agent solution is added to a reducing solution of α-indanthrone pigment, accidentally, by misoperation, performed an operation in which a reducing solution of pigment was added to an oxidizing agent solution, and thereby obtained an indanthrone blue pigment which exhibits a more reddish blue hue with high chroma. Results from X-ray diffraction spectra of this indanthrone blue pigment shows diffraction peak corresponding to $2\theta \pm 0.2°$ at 6.4°, 11.2°, 13.0°, 16.7°, 22.5°, 23.9°, and 27.1°, and it became clear that it was δ-indanthrone blue which was conventionally not obtained for a pigment. Moreover, it became clear that this pigment is superior in dispersability, weather resistance, and crystalline stability, and the present invention reached completion.

Namely, in order to solve the above-mentioned problem, the present invention provides (1) a δ-indanthrone blue pigment having an average primary particle diameter in the range of 0.5 μm or less, and (2) a δ-indanthrone blue pigment having a chroma C* value of 20 or greater; a hue angle in the range of 275~283 when colorimetry is performed on a paint film made from a melamine alkyd paint in which the proportion of pigment in the solid portion is 9.6%; and containing δ-indanthrone blue pigment and titanium dioxide pigment in a ratio of 1 to 20 by weight.

Moreover, in the invention of one embodiment of the present application, a paint film containing dispersed pigments measuring hue angle H and chroma C* value is obtained by means of the following method.

10.0 parts by weight of δ-indanthrone blue pigment, 32.5 parts by weight of melamine alkyd resin for paint use (a mixture of BECKOSOL J-524-IM-60/super BECKAMINE L-117-60, non volatile ratio=7/3 by weight, manufactured by DAINIPPON INK & CHEMICALS, INC.), 32.5 parts by weight of xylene/n-butanol (ratio of 3/1 by weight) and 150 parts by weight of 3 mm diameter glass beads are weighed into a 250 ml wide mouthed glass bottle, and, after capping, dispersed for 2 hours using a Paint Shaker made by TOYO SEIKI (for use with an electrical power source of 50 hertz). After adding an additional 125.0 parts by weight of melamine alkyd resin, and mixing for 10 minutes using a Paint Shaker, a δ-indanthrone blue pigment dispersion paint is prepared.

Separately, as white paint for tinting shade, a white paint is prepared in the same way as the dispersed paint of δ-indanthrone blue pigment with the exception that 10.0 parts by weight of "TIPAQUE R-930" (titanium dioxide pigment manufactured by ISHIHARA SANGYO KAISHA, LTD) are used in place of 10.0 parts by weight of δ-indanthrone blue pigment.

1 part by weight of the dispersed paint of δ-indanthrone blue pigment prepared as above and 20 parts by weight of the white paint are mixed, making a white diluted paint. This paint is applied to a coated paper using a film applicator of 6 mil (⁶⁄₁₀₀₀ of an inch), and, after leaving for 1 hour, a paint film is obtained by baking it.

Colorimetry is performed on this paint film using a light source of D65 and a field of 10 degrees by means of a Spectraflash 500 spectrophotometer manufactured by Datacolor International Company, and the hue angle H and chroma C* are calculated.

As is evident from the examples and comparative examples mentioned below, it is clear that a δ-indanthrone blue pigment which has a chroma C* value of 20 or greater, and which has a hue angle H in the range of 275–283 when colorimetry is performed on a paint film containing dispersed δ-indanthrone blue pigment prepared in the above manner is a pigment exhibiting a more reddish blue hue with chroma and superior crystalline stability, weather resistance, and dispersability. However, as in the invention of one embodiment, it is evident that the average primary particle diameter of a pigment having hue angle H and chroma C* in these ranges is 0.5 μm or less.

The specific δ-indanthrone blue pigment of the present invention which exhibits strong reddish blue colors has a characteristic point of having more beautiful color of more reddish blue hue than the indanthrone blue pigment which has an α crystal form. Since there is the CIE color system hue angle as an indicator expressing hue and C* as an indicator expressing chroma, when expressed using these indicators, the reddish blue hue with high chroma which is the object of the present invention is characterized by expressing a chroma C* of 20 or greater, and a hue angle H in the range of 275–283 when used in a paint film containing the white paint for use for tinting (in a ratio of 1 to 20 parts by weight of δ-indanthrone blue pigment and titanium dioxide pigment) of melamine alkyd paint, as is also stated in the examples. For the hue angle, in the color range of blue, the larger the number, the stronger the redness, for example, as is clear from Table 1 in which the results from the examples and comparative examples are arranged. α-indanthrone blue pigment has a hue angle of 265, in contrast, the specific δ-indanthrone blue pigment of the present invention has a greater hue angle of 274–281, and the fact that it has by far a stronger reddish blue hue than α-indanthrone blue pigment can be understood. It is clear that the specific δ-indanthrone blue of the present invention has a greater hue angle and a stronger redness even when compared with the δ-indanthrone blue pigment which is based on the manufacturing method of the PB report.

On the other hand, from the data for chroma, based on the manufacturing method of the PB report, δ-indanthrone blue has a C* of 16, therefore the chroma is low, and it has no value as a color, in contrast, it is clear that the specific δ-indanthrone blue pigment of the present invention has a high C* of 28.7, and has high value as a color.

Figure 4:
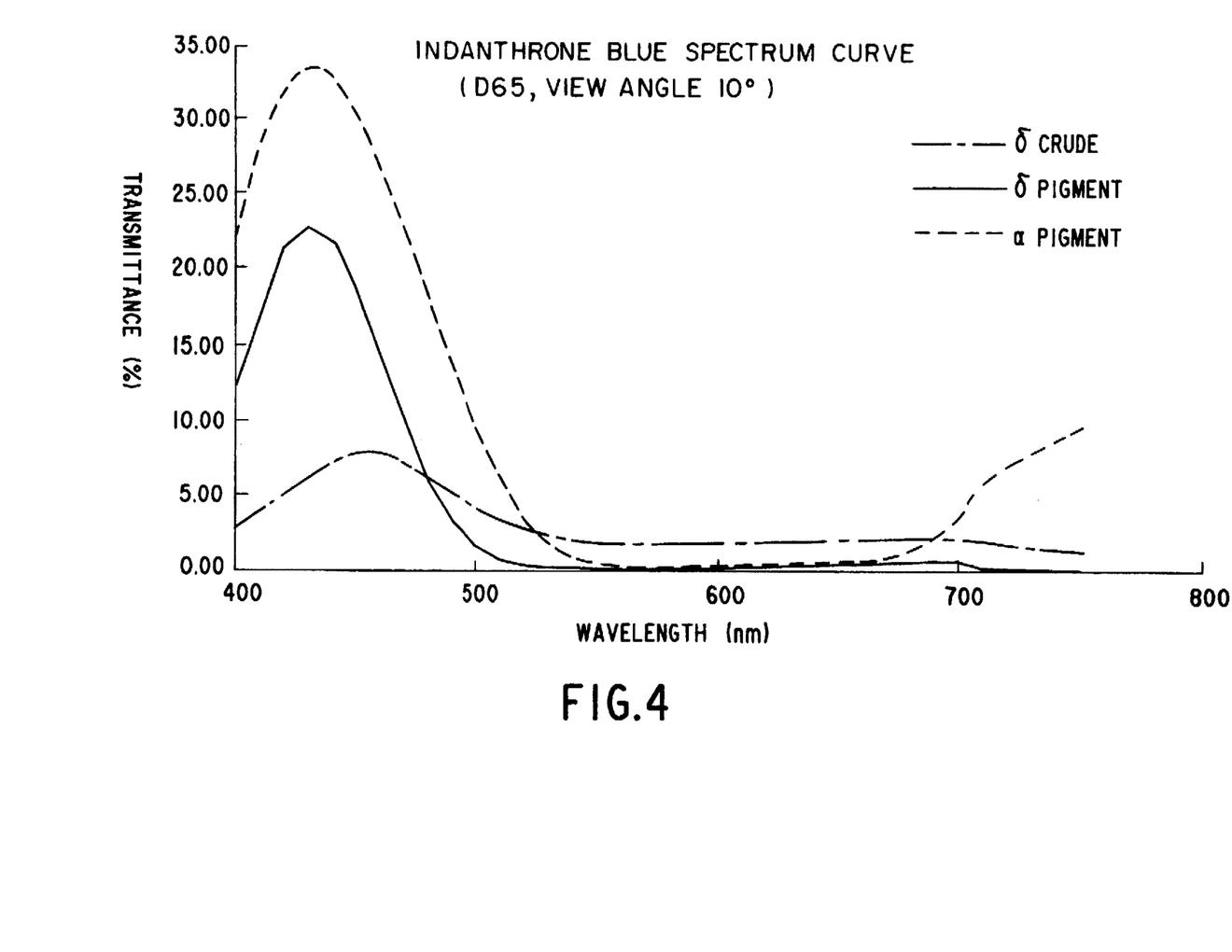
FIG. 4 is a spectrum transmittance curve in the visible light range for a paint film obtained by applying the indanthrone blue pigment dispersion alkyd paint which was used in Applied Example 1, Comparative Applied Example 1, and Comparative Applied Example 3 to a transparent plastic film using an applicator, and then drying. Moreover, represents the above-mentioned Applied Example 1, -.-.-. represents Comparative Applied Example 1, and - - - represents Comparative Applied Example 3.

Even in paint film in which aluminum flake pigment was mixed in place of titanium dioxide, as expected, a more reddish blue hue was obtained compared with the hue obtained when α-indanthrone blue pigment was used. In addition, for comparison, in FIG. 4, a spectrum transmittance curve is shown for full shade paint film which was made by baking after drawing down the full shade paint on to transparent plastic film using an applicator. As is clear from FIG. 4, the publicly known α-indanthrone blue pigment has a transmittance peak at 430 nm, and most light of wavelengths from 540 nm to 680 nm is not transmitted, while in contrast, light of wavelengths longer than 680 nm suddenly becomes highly transmittable. On the other hand, the specific δ-indanthrone blue pigment of the present invention also has a transmittance peak at 430 nm, however, most light of wavelengths of the range from 520 nm to 750 nm is not transmitted. The δ-indanthrone made by the method of the PB report has a transmittance peak at 450 nm, a difference of 20 nm in transmittance peak position with the specific δ-indanthrone blue pigment of the present invention.

The specific δ-indanthrone blue pigment of the present invention can be manufactured by means of reduction, in an alkaline aqueous solution, of a chemical compound having the skeleton expressed by the general formula:

(in the formula, $X^1$, $X^2$, $X^3$, and $X^4$ each independently represent a hydrogen atom or a halogen atom) followed by rapid oxidation. However, the specific δ-indanthrone blue pigment of the present invention can be manufactured by methods other than this method.

In the PB Report and the JOURNAL OF THE JAPAN SOCIETY OF COLOUR MATERIAL, as quoted in the "Description of the Related Art" of this invention, crystal formation of β-indanthrone blue to α-indanthrone blue by means of oxidation at high temperature after reduction, and that γ-indanthrone blue can be manufactured from α-indanthrone blue by means of oxidation at 50° C. or below after reduction are disclosed, but it has not been possible to manufacture the specific δ-indanthrone blue pigment of the present invention which exhibits strong reddish blue color simply by means of a method of reduction and oxidation.

As an alkali for the alkaline aqueous solution used in the reduction reaction, for example, alkalis such as sodium hydroxide, and potassium hydroxide can be mentioned, however, even from within these, sodium hydroxide is particularly preferable. In addition, surface active agent, dispersants, organic solvents, etc. can be mixed into this alkaline aqueous solution.

As a reducing agent, for example, hydrosulfite, rongalit, and the like can be mentioned, but the reducing agent is not limited to these.

As reducing conditions in the alkaline aqueous solution, a reducing electric potential of −700 mV or less is preferable, and a reducing electric potential in the range of −800 mV to −1200 mV is particularly preferable.

A reduction temperature for the alkaline aqueous solution in the range of 40°–100° C. is preferable, and in the range of 55°–90° C. is particularly preferable.

After reduction, as a method for rapid oxidation, for example, (1) a method in which a reducing solution of indanthrone blue is added using a pump into an oxidizing agent solution comprising an oxidizing agent and a solvent; and (2) a method in which an oxidizing agent solution and a reducing solution are respectively, using a pump, mixed and stirred by means of a line mixer; etc. can be mentioned, but the method is not limited to these.

As an oxidizing agent, hydrogen peroxide, potassium permanganate, perboric acid, and the like can be mentioned, but the oxidizing agent is not limited to these.

As the solvent used in the oxidizing solution, a substance which dissolves the oxidizing agent, and moreover, which does not react with the oxidizing agent is suitable, however the solvent is not particularly limited, and water, for example, can be mentioned.

For whichever method, it is preferable that the oxidizing solution contain sufficient oxidizing agent to oxidize the reduced substance.

In addition, the temperature of the oxidizing solution is not limited, but a range of 0°–40° C. is preferable, and in particular, lower temperatures are more preferable.

The electric potential after oxidation is not particularly limited, however an electric potential of −699 mV or greater is preferable, when the electric potential is less than this, oxidation is insufficient, and there is a possibility of generating a mixture of α-form and δ-form crystals.

The manufacturing method of the present invention is remarkably useful for manufacturing a specific δ-indanthrone blue pigment exhibiting a strong reddish blue color which was not possible to obtain by means of conventional art.

The specific δ-indanthrone blue pigment which exhibits a strong reddish blue color obtained by means of the manufacturing method of the present invention formed by filtering, washing, and being put into its form for use: a pigment form such as a water dispersed slurry pigment, a wet pigment, a dried and micronized powder pigment, and the like.

The δ-indanthrone blue pigment of the present invention typically has main diffraction peaks, according to an X-ray diffraction pattern, of 2θ±0.2° at 6.4°, 11.2°, 13.0°, 16.7°, 22.5°, 23.9°, and 27.1°, and there is no problem associated with having other diffraction peaks. Depending on the crystallization of the pigment, there is also the possibility that within these diffraction peaks, diffraction peaks which have weak peak strength are hidden in the shoulders of diffraction peaks which have strong peak strength. In addition, because of variation due to the size and shape of the pigment, or various preset values for the X-ray diffraction device, measurement conditions, etc., the strength of these peaks is not distinctive. Furthermore, an RINT1100 (manufactured by Rigaku Denki Co.), using CuKα1 rays, was used for measuring X-ray diffraction. Furthermore, when making measurements using this machine, silicon powder which is approved by NBS was used for 2θ correction. The measurements were calculated with an accuracy of 2θ at $10^{-1}$ or greater accuracy and used.

In addition, in the X-ray diffraction peak of the specific δ-indanthrone blue pigment, which exhibits a strong reddish blue color, obtained by means of the manufacturing method of the present invention, there is cohesion because the average primary particle diameter is small, for that reason, the peaks in that X-ray diffraction spectrum are of 2θ±0.2° at 6.4°, 11.2°, 13.0°, 16.7°, 22.5°, and 27.1°, and the peak near 23.9° may be hidden in the shoulder of other peaks and may not be apparent. However, its average primary particle diameter is in the range of 0.001–0.5 μm, and therefore, because it has a beautiful color of more reddish blue hue when compared with the hue of α-form crystals, the grayish color of the δ-form crystals of the conventional art, etc., the above-mentioned crystal is a crystal flocculated δ-indanthrone blue pigment.

Furthermore, by loosening the flocculation between these particles, the peak at 23.9°±0.2° appears, and a δ-indanthrone blue pigment which has superior δ-form crystalline properties and, moreover, is superior in dispersability can be obtained.

As a method in which the δ-indanthrone blue pigment is manufactured by loosening the flocculation, a method can be mentioned in which a compound having a formula of the skeleton:

is reduced in an alkaline aqueous solution, rapidly oxidized, and then wet-milled.

As a method for wet-milling, a wet-milling method in an organic solvent, water, or a mixture of inorganic solvent and water can be mentioned. The δ-indanthrone blue pigment used at this time can be in any of the following conditions: a post reduction-oxidation water dispersed slurry, or wet or dry micronized powder. In addition, if necessary, it is possible to mix in organic pigment derivatives, dispersants, and filler pigments, while wet-milling. In particular, because organic pigment derivatives, high polymer dispersants, etc. can prevent crystallization of δ-indanthrone blue pigment while wet-milling, the manufacture of a more stable δ-indanthrone blue pigment is possible, and therefore, combination is preferable.

As the organic solvent used in wet-milling, for example, aromatic solvents such as xylene, and toluene; aliphatic solvents such as hexane, and mineral spirit; alcohol solvents such as ethanol, isopropanol, n-butanol, and isobutanol; ester solvents such as ethyl acetate, and butyl acetate; ketone solvents such as methyl ethyl ketone, and methyl butyl ketone; and the like can be mentioned, however the organic solvent is not limited to these.

As organic pigment derivatives which can be used in wet-milling in accordance with necessity, for example, pigments derivatives in which substituents such as $C_1$ or greater alkyl group, halogen group, phthalimide group, dialkylaminomethyl group, sulfon amide group, sulfonic acid amino salt, sulfonic acid group, and sulfonic acid metal salt group have been substituted into organic pigments such as phthalocyanine, dioxazine, indanthrone blue, anthraquinone, diamino-dianthraquinonyl, quinacridone, perylene, quinophthalone, can be mentioned, however, the organic pigment derivatives are not limited to these. Within these organic pigment derivatives, derivatives of organic pigments such as phthalocyanine, dioxazine, indanthrone blue, and anthraquinone are preferable, and organic pigment derivatives having phthalimide group which can be substituted by alkyl group; aromatic compounds such as benzene, and toluene; a carboxyl group, an amino group, a hydroxyl group, and the like are preferable.

As a manufacturing method for the organic pigment derivative, for example, in accordance with known methods, an organic pigment derivative which has a phthalimidemethyl group is obtained by dissolving organic pigment, phthalimide and paraform in sulfuric acid, and heating; organic pigment derivatives having a sulfonic acid aluminum salt is obtained by means of sulfonation in concentrated sulfuric acid and by subsequently laking with aluminum chloride; etc. can be mentioned, however the manufacturing method for the organic pigments is not limited to these.

When using organic pigment derivatives in the indanthrone blue pigment, 30% by weight or less is preferable, and an amount in the range of 0.5~20% by weight is even more preferable.

As a dispersant which can be used in wet-milling in accordance with necessity, for example, a rosin such as a hydrogenated rosin; a polymer dispersant such as Disperbyk-160, Disperbyk-162, Disperbyk-164, Disperbyk-182 (manufactured by BYK Chemie GmbH) EFKA-401, EFKA-402, (manufactured by EFKA Chemicals, Co.) Solsperse 24000 (produced by Zeneka Colours); a polyester dispersant of a molecular weight of 1000 or greater; a nonionic surface active agent; an anionic surface active agent; and a cationic surface active agent can be mentioned, however, the dispersant is not limited to these.

With regard to the quantity used when using the dispersant in the indanthrone blue pigment, 30% by weight or less is preferable, and an amount in the range of 0.5~20% by weight is even more preferable.

As filler pigments which can be used in the wet-milling in accordance with necessity, for example, barium sulfate, white carbon, chromium oxide, cuprous oxide, calcium carbonate, clay, and talc can be mentioned, however the filler pigment is not limited to these.

As a device which can be used in wet-milling, for example, known milling devices such as a bead mill, a ball mill, a kneader, and an attritor can be mentioned.

Any size and type of bead can be used in the bead mill, for example, as types of beads, glass beads, ceramic beads, etc. can be mentioned. The preferable size of the beads is in the range of 0.1 mm diameter~100 mm diameter.

The milling temperature and the milling time are changed, depending on the type of solvent and milling device used, therefore, the milling temperature and the milling time are not limited, however, a milling temperature in the range of 5°~80° C. is preferable, and a milling time in the range of 15 minutes to 12 hours is preferable. Particularly from the standpoint of energy costs and the standpoint of crystal transformation from δ-form to α-form, it goes without saying that milling for long periods of time at high temperatures should be avoided.

The average primary particle diameter of the specific δ-indanthrone blue pigment, which exhibits a strong reddish blue color, of the present invention is preferably 0.5 μm or less, and even more preferably in the range of between 0.005 μm and 0.2 μm. When the number of particles having a larger particle diameter than 0.5 μm increases, when applied to paint, the gloss of the paint film is remarkably reduced, and also, chroma is reduced and grayness increases, the pigment's value in terms of color is reduced, and this is undesirable. Moreover, based on the electron microscope photographs of the pigment, several tens of particles were randomly sampled, and their respective length and breadth measured, the average value of the length and the average value of the width were calculated, and then the average value of the length and the average value of the width were averaged, thus indicating the average primary particle diameter referred to in the specification of the present invention.

In addition, the specific surface area depending on the BET method for the specific δ-indanthrone blue pigment, which exhibits a strong reddish blue color, of the present invention is preferably in the range of 5~400 m²/g, and more preferably in the range of 10~200 m²/g.

However, when the primary particle diameter is too small, even a pigment having a large theoretical specific surface area, for a situation without flocculation, may have a specific surface area of 1 m²/g or less because of the strong flocculation between fine particles of pigment. Even on these occasions, if the pigment can be sufficiently dispersed, high chroma can be obtained.

The δ-indanthrone blue pigment of the present invention, contains 60% or greater of the indanthrone blue represented by the following general formula:

(in the formula, x1, x2, x3, and x4 each independently represent a hydrogen atom or a halogen atom) and preferably 80% or greater; it can also contain, as other components, filler pigments; various surface treatment agents such as organic pigment derivatives and dispersants; etc.

As organic pigments derivatives which can be contained in the δ-indanthrone blue pigment of the present invention, the same organic pigment derivatives which were mentioned as being suitable for use in wet-milling can be mentioned.

As dispersants which can be contained in the δ-indanthrone blue pigment of the present invention, the same dispersants which were mentioned as being suitable for use when wet-milling can be mentioned.

As filler pigments which can be contained in the δ-indanthrone blue pigment of the present invention, the same fillers which were mentioned as being suitable for use in wet-milling can be mentioned.

The stability of δ-indanthrone blue as a coloring material used in the normal using conditions has enduring stability, for example, when dispersed in plastics, such as polyvinyl chloride, there is no remarkable crystal transformation, variation in hue, etc.; it can be said that when paints containing δ-indanthrone blue pigment are stored for long periods, there is no remarkable crystal transformation, variation in hue, etc.; the δ-indanthrone blue pigment of the present invention, as a coloring material, has enduring stability.

However, as published in the PB Report, with regard to the crystal form of δ-indanthrone blue, when the δ-indanthrone blue crystals are not surface treated, they are unstable at temperatures of 250° C. or above. In addition, depending on the type of organic solvent, when stored for a long time or heated in the organic solvent. For example, δ-crystals convert to α-crystals by refluxing in xylene.

As for the crystallization of δ-indanthrone blue, when used under such severe conditions, crystal transformation does finally occur, and it goes without saying that a pigment which does not undergo crystal transformation under such severe conditions is more preferable.

It can be mentioned as organic solvents generally used in coloring materials for examining the problem of crystal transformation of δ-indanthrone blue, for example, an aromatic hydrocarbon solvent such as toluene and xylene; an aliphatic hydrocarbon solvent such as mineral spirit; an alcohol solvent such as methanol and ethanol; an ester solvent such as ethyl acetate; a ketone solvent such as methyl ethyl ketone; an ether solvent such as ethylene glycol; etc.

With regard to δ-indanthrone blue pigment which contains the previously mentioned organic pigment derivatives, and or dispersants, it is possible to keep the crystal form stable and the crystals not to dissolve into the organic solvent even under such conditions, since δ-indanthrone blue pigment is not directly exposed to organic solvent and does not directly receive the energy which is necessary for crystal transformation, due to the adsorption of resin dispersants, organic pigment derivatives, etc. to the pigment surface. In particular, as preferable organic pigment derivatives which are suitable to enhance the crystal stability, are anthraquinone, indanthrone blue, dioxazine, and phthalocyanine having a phthalimide group into which alkyl groups; aromatic compounds such as benzene, and toluene; carboxyl groups; amino groups, hydroxyl groups; etc. may be introduced.

Organic pigment derivatives content in the δ-indanthrone blue pigment is preferably 30% by weight or less, and more preferably in the range of 0.5~20% by weight.

Polymer dispersants content in the δ-indanthrone blue pigment is preferably 30% by weight or less, and more preferably in the range of 0.5~20% by weight.

As treatments for pigments by these inorganic pigment derivatives, polymer dispersants, etc., for example, (1) a method of mechanochemical surface treatment in which δ-indanthrone blue pigment and organic pigment derivatives are mixed by means of a disperser, such as an attritor; (2) a method of surface treatment in which δ-indanthrone blue is dispersed in an organic solvent, such as isopropyl alcohol, and then a resin dispersant is deposited on to the surface of the pigment by means of adding the resin dispersant and adding water; etc. can be mentioned, but the treatment method is not limited to these.

By means of a known dispersion machine, the δ-indanthrone blue pigment can then be used as δ-indanthrone blue pigment dispersion. As a dispersion, for example, paints in which alkyd resin, acrylic resin, urethane resin, polyester resin, amide resin, melamine resin, ether resin, and fluoro resin are used; polyolefins such as polyvinyl chloride, polymethyl methacrylate, polystyrene, ABS resin, AS resin, polyethylene, polypropylene, etc.; polyamide, polyacetal, polycarbonate, polyesters such as PET, PBT, and the like; plastics containing denatured polyphenylene ether; and printing inks such as gravure ink, offset ink, metal deco ink, and jet ink; materials for the record such as color toner, color filter, and the like; and generally known materials can be mentioned, however the dispersions are not limited to these.

As dispersion machines, known dispersion machines such as dispensers, homomixers, bead mills, ball mills, two roll mills, three roll mills, and pressure kneaders can be mentioned, however the dispersion machine is not limited to these.

When the δ-indanthrone blue pigment is dispersed in a dispersion, δ-indanthrone blue pigment content in the dispersion is preferably 90% by weight or less, and more preferably in the range of 0.01~50% by weight.

The components in the dispersion other than δ-indanthrone blue pigment are the dispersion medium, as a dispersion medium, solvents and resins which are used in dispersions such as the above-mentioned paints, plastics, printing inks, and color toners can be mentioned.

As solvents which can be used as dispersion mediums, for example, aromatic hydrocarbon solvent such as toluene and xylene; an aliphatic hydrocarbon solvent such as mineral spirit; an alcohol solvent such as methanol and ethanol; an ester solvent such as ethyl acetate; a ketone solvent such as methyl ethyl ketone; an ether solvent such as ethylene glycol; etc. can be mentioned, however the solvents are not limited to these.

In addition, if it is necessary, in the dispersion, stabilizing agents, auxiliary materials, etc., such as wetting agents, antiskinning agents, ultraviolet ray absorbing agents, and antioxidants can be used in the dispersion.

Since the dispersion conditions are different depending on media and the dispersion machine, it is not possible to strictly decide the dispersion temperature and the dispersion time in the same way, however, a dispersion temperature in the range from room temperature to 240° C. is preferable, and in the range from room temperature to 150° C. is more preferable, a dispersion time within 120 hours is preferable, and within 5 hours is more preferable.

If it is necessary, the δ-indanthrone blue pigment dispersion can be mixed with other additives, pigments, dye stuffs, etc., and prepared into a final paint, printing ink, plastic, color toner, and various other documented agents.

The specific δ-indanthrone blue pigment of the present invention has enduring weather resistance as a coloring material, for example, an automobile paint using the specific δ-indanthrone blue pigment of the present invention has high weather resistance which is sufficient for long use.

In addition, even when the specific δ-indanthrone blue pigment of the present invention is used in printing ink or plastic, a more reddish blue color is obtained compared to the color which is obtained when α-indanthrone blue pigment is used.

THE BEST MODE FOR CARRYING OUT THE INVENTION

In the following, the present invention is explained in further detail using Examples, Comparative Examples, and Applied Examples; however, the present invention is not limited to these examples. In the following, without any special limit. "part" and "%" respectively express "parts by weight" and "% by weight".

EXAMPLE 1

[Manufacture of δ-indanthrone Blue Pigment]

600 parts of water were put into a reaction vessel, and, while being stirred, heated to 60° C. Next, 54.4 parts of 48% sodium hydroxide aqueous solution and 18.8 parts of hydrosulfite were added to the reaction vessel; furthermore, after 12.0 parts of crude indanthrone blue were added, and while stirring for 15 minutes at 60° C., reduction occurred, and a reduction solution of indanthrone blue was obtained. The electric potential at this time was −1060 mV.

In addition, an oxidizing solution was manufactured by putting 400 parts of water and 25.0 parts of 30% hydrogen peroxide in water into another reaction vessel, and keeping the temperature at 20° C. while stirring.

Figure 1:
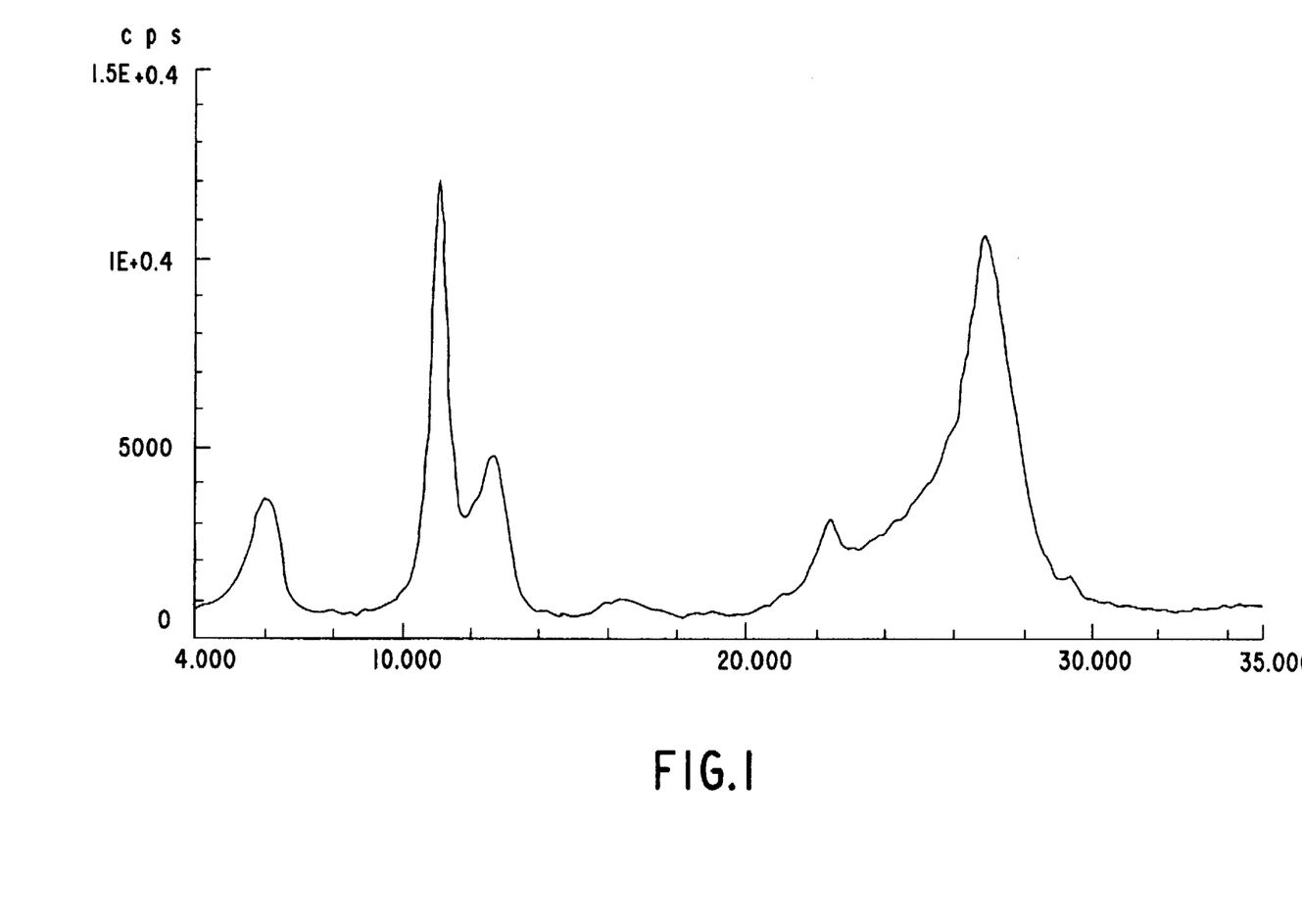
FIG. 1 is an X-ray diffraction pattern of a δ-indanthrone blue pigment obtained by means of Example 1.

Next, using a pump, at a speed of 500 ml per minute, the reduction solution of indanthrone blue was poured into the oxidizing solution, which was being stirred, and the oxidation reaction took place. After the oxidation reaction was completed, stirring was continued for an additional 1 hour, then filtration was performed, and the residue was washed until the filtrate became neutral. The residue was dried, and after pulverizing, 11.5 parts of a cohesive δ-indanthrone blue pigment was obtained which had an average primary particle diameter of 0.035 μm according to electron microscopy, a specific surface area of 31.7 $m^2/g$ according to a BET method, and displayed the X-ray diffraction spectrum of FIG. 1. Moreover, X-ray diffraction peaks of $2\theta\pm0.2°$ at 6.3°, 11.1°, 12.8°, 16.5°, 22.4°, and 27.0° were displayed. In addition, because of high flocculation, the peak in the vicinity of 23.9° was hidden in the shoulder of the peak of 27.0°.

EXAMPLE 2

[Manufacture of δ-indanthrone Blue Pigment]

600 parts of water were put into a reaction vessel, and, while being stirred, heated to 70° C. Next, 54.4 parts of 48% sodium hydroxide aqueous solution and 18.8 parts of hydrosulfite were added to the reaction vessel; furthermore, after 12.0 parts of crude indanthrone blue were added, and while stirring for 15 minutes at 60° C., reduction occurred, and a reduction solution of indanthrone blue was obtained. The electric potential at this time was −1120 mV.

In addition, an oxidizing solution was manufactured by putting 400 parts of water and 25.0 parts of 30% hydrogen peroxide in water into another reaction vessel, and keeping the temperature at 0° C. while stirring.

Next, using a pump, at a speed of 200 ml per minute, the reduction solution of indanthrone blue was poured into the oxidizing solution, which was being stirred, and the oxidation reaction took place. After the oxidation reaction was completed, stirring was continued for an additional 1 hour, then filtration was performed, and the residue was washed until the filtrate became neutral. The residue was dried, and after pulverizing, 11.6 parts of a flocculation δ-indanthrone blue pigment was obtained which had an average primary particle diameter of 0.028 μm according to electron microscopy, a specific surface area of 45 $m^2/g$ according to a BET method, and displayed X-ray diffraction peaks of $2\theta\pm0.2°$ at 6.3°, 11.1°, 12.8°, 16.4°, 22.5°, and 27.0° in an X-ray diffraction spectrum. In addition, because of high flocculation, the peak in the vicinity of 23.9° was hidden in the shoulder of the peak of 27.0°.

EXAMPLE 3

[Manufacture of δ-indanthrone Blue Pigment]

Figure 2:
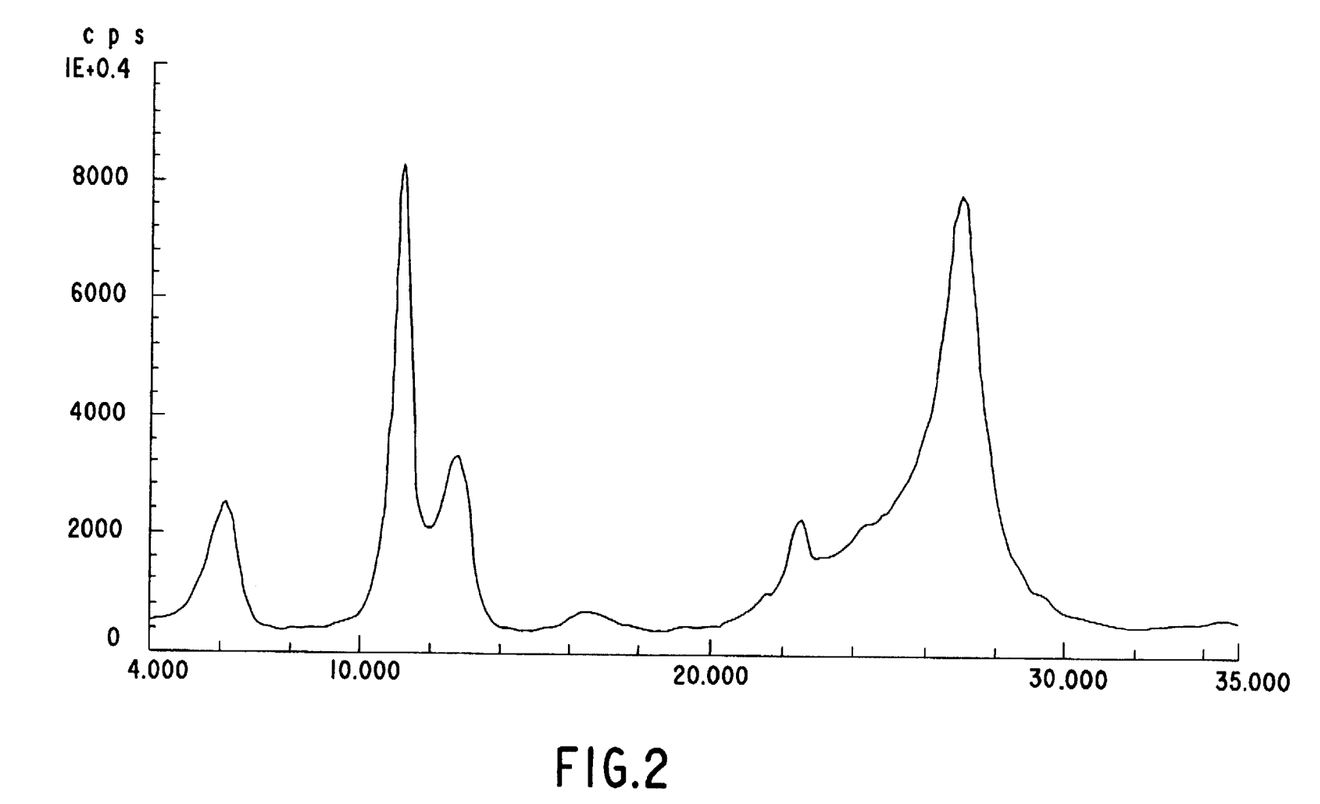
FIG. 2 is an X-ray diffraction pattern of a δ-indanthrone blue pigment obtained by means of Example 3.

10.0 parts of the δ-indanthrone blue pigment obtained in Example 2, 90 parts of isopropyl alcohol, and 400 parts of 0.5 mm diameter ceramic beads were put into a vessel of sand grinder and milled 1100 rpm at room temperature. After milling, filtration, washing, drying, and pulverizing were performed, 9.3 parts of a non-flocculation δ-indanthrone blue pigment were obtained which had an average primary particle diameter of 0.030 μm according to electron microscopy, a specific surface area of 53 $m^2/g$ according to a BET method, and displayed the X-ray diffraction spectrum of FIG. 2. Moreover, X-ray diffraction peaks of $2\theta\pm0.2°$ at 6.3°, 11.1°, 12.8°, 16.5°, 22.4°, 24.1, and 27.0° were displayed.

EXAMPLE 4

[Manufacture of δ-indanthrone Blue Pigment]

10.0 parts of the δ-indanthrone blue pigment obtained in Example 2, 100 parts of water, and 100 ml parts of 0.25 mm diameter ceramic beads are put into a vessel of sand grinder and milled at 1100 rpm at room temperature. After milling, filtration, washing, drying, and pulverizing were performed, 9.3 parts of a non-flocculation δ-indanthrone blue pigment were obtained.

This pigment had an average primary particle diameter of 0.030 μm according to electron microscopy, a specific surface area of 62 $m^2/g$ according to a BET method, and displayed X-ray diffraction peaks of $2\theta\pm0.2°$ at 6.3°, 11.1°, 12.8°, 16.5°, 22.4°, 24.1, and 27.0° in an X-ray diffraction spectrum.

EXAMPLE 5

[Manufacture of δ-indanthrone Blue Pigment]

20 g of the indanthrone blue pigment obtained in Example 1 was added to 400 g of 80% sulfuric acid, and after stirring for 1 hour, taken out and put into 5 kg of water. The precipitate was filtered, washed until the filtrate had a pH of 7, dried, and pulverized, and 19.6 parts of δ-indanthrone blue pigment were obtained.

This pigment had an average primary particle diameter of 0.50 μm according to electron microscopy, a specific surface area of 9.8 $m^2/g$ according to a BET method, and displayed X-ray diffraction peaks of $2\theta\pm0.2°$ at 6.3°, 11.1°, 12.8°, 16.5°, 22.4°, 24.1, and 27.0° in an X-ray diffraction spectrum.

Comparative Example 1

[Manufacture of δ-indanthrone Blue Pigment According to the PB Report]

200 parts of 95% sulfuric acid and 20 parts of α-indanthrone blue were put into a reaction vessel, and while stirring, 500 g of water were dripped in over 9 hours. After that, stirring was stopped, and after being left overnight, filtration was performed, the residue was washed, dried, and pulverized, and 19.3 parts of indanthrone blue pigment were obtained.

This pigment had an average primary particle diameter of 2.5 μm according to electron microscopy, a specific surface area of 2.8 $m^2/g$ according to a BET method, and displayed X-ray diffraction peaks of $2\theta\pm0.2°$ at 6.4°, 11.2°, 13.0°, 16.7°, 22.5°, 23.9, and 27.1° in an X-ray diffraction spectrum, and had the δ-crystal form as in the PB Report.

Comparative Example 2

[Manufacture of δ-indanthrone Blue Pigment According to the PB Report]

170.8 parts of 95% sulfuric acid and 20 parts of α-indanthrone blue were put into a reaction vessel, dissolved, and then, while stirring, 32.1 g of water were added slowly over 1 minute, and after the sulfuric acid concentration became 80%, stirred at room temperature for 30 minutes. Filtration was performed, and the residue was washed, dried, and pulverized, and 19.3 parts of indanthrone blue pigment were obtained.

This pigment had an average primary particle diameter of 0.72 μm according to electron microscopy, a specific surface area of 4.8 m²/g according to a BET method, displayed X-ray diffraction peaks of 2θ±0.2° at 6.3°, 11.1°, 12.8°, 16.5°, 22.4°, 24.1, and 27.0° in an X-ray diffraction spectrum, and had the δ-crystal form.

EXAMPLE 6

[Manufacture of δ-indanthrone Blue Pigment Containing Resin Dispersant]

9.5 parts of the δ-indanthrone blue pigment obtained in Example 1, 2.5 parts of "BYK-182" (manufactured by BYK-Chemie Gmbh) as a resin dispersant, 100 parts of isopropyl alcohol, and 100 ml of 0.5 mm diameter ceramic beads were measured and put into a 300 ml vessel, then put into a sand grinder, and wet-mill processed at 1100 rpm at normal temperature. After milling, the filtration was performed, and the residue was washed in hot water. The residue was dried, pulverized, and 9.7 parts of a non-flocculation δ-indanthrone pigment were obtained.

This pigment had an average primary particle diameter of 0.033 μm according to electron microscopy, a specific surface area of 58 m²/g according to a BET method, and displayed X-ray diffraction peaks of 2θ±0.2° at 6.3°, 11.1°, 12.8°, 16.5°, 22.4°, 24.1, and 27.0° in an X-ray diffraction spectrum.

EXAMPLE 7

[Manufacture of δ-indanthrone Blue Pigment Containing Phthalimide Methyl Indanthrone Blue]

Figure 3:
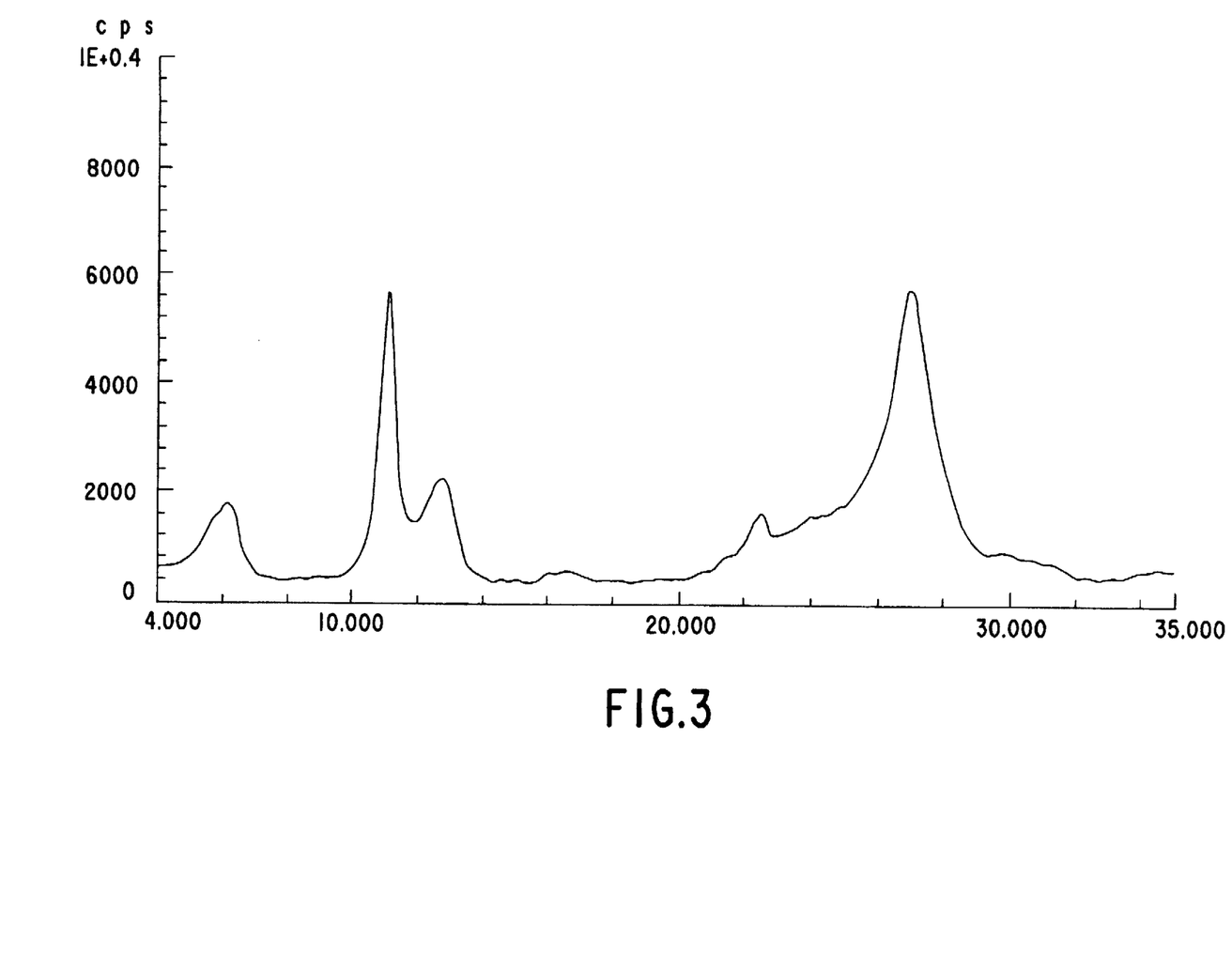
FIG. 3 is an X-ray diffraction pattern of a δ-indanthrone blue pigment which contains phthalimide methyl indanthrone blue obtained by means of Example 7.

9.5 parts of the δ-indanthrone blue pigment obtained in Example 1, 0.5 parts of phthalimide methyl indanthrone blue, 100 parts of xylene, and 100 ml of 0.5 mm diameter ceramic beads were measured and put into a 300 ml vessel, then put into a sand grinder, and wet-mill processed at 1100 rpm at normal temperature. After milling, filtration was performed, and the residue was washed in hot water, dried, pulverized, and 9.2 parts of a non-flocculation δ-indanthrone pigment were obtained which displayed the X-ray diffraction spectrum shown in FIG. 3.

This pigment had an average primary particle diameter of 0.034 μm according to electron microscopy, a specific surface area of 62 m²/g according to a BET method, and displayed X-ray diffraction peaks of 2θ±0.2° at 6.3°, 11.1°, 12.8°, 16.6°, 22.5°, 23.9, and 27.0° in an X-ray diffraction spectrum.

EXAMPLE 8

[Manufacture of δ-indanthrone Blue Pigment Containing Phthalimide Methyl Copper Phthalocyanine]

9.3 parts of a non-cohesive δ-indanthrone blue pigment were obtained in the same way as Example 7, with the exception that phthalimide methyl copper phthalocyanine was used in place of phthalimide methyl indanthrone blue.

This pigment had an average primary particle diameter of 0.032 μm according to electron microscopy, a specific surface area of 65 m²/g according to a BET method, and displayed X-ray diffraction peaks of 2θ±0.2° at 6.4°, 11.2°, 13.0°, 16.7°, 22.5°, 24.1, and 27.0° in an X-ray diffraction spectrum.

Applied Example 1

10.0 parts by weight of the δ-indanthrone blue pigment obtained in Example 1, 32.5 parts by weight of melamine alkyd resin for paint use (a mixture of BECKOSOL J-524-IM-60/super BECKAMINE L-117-60 at a ratio=7/3 solid parts by weight, manufactured by DAINIPPON INK & CHEMICALS, INC.), 32.5 parts by weight of xylene/n-butanol (ratio of 3/1 by weight) and 150 parts by weight of 3 mm diameter glass beads were weighed in a 250 ml capacity glass bottle, and, after capping, dispersed for 2 hours using a Paint Shaker produced by TOYOSEIKI (for use with electrical power source of 50 hertz). Furthermore, after adding 125.0 parts by weight of melamine alkyd resin, and being mixed for 10 minutes using a Paint Shaker, a δ-indanthrone blue pigment dispersion melamine alkyd paint was obtained.

A dispersed white paint was made which had the same formation as the above-mentioned δ-indanthrone blue pigment dispersion alkyd paint by only using 10 parts of "TIPAQUE R-930" (manufactured by ISHIHARA SANGYO KAISHA, LTD) in place of the above mentioned δ-indanthrone blue pigment.

Next, a tinting shade paint was made by mixing 1 part of δ-indanthrone blue pigment dispersion alkyd paint with 20 parts of the white paint. The tinting shade paint obtained in this manner was applied to a coat paper using a film applicator of 6 mil (⁶⁄₁₀₀₀ of an inch), and, after being left for 1 hour, and bake dried in an 140° C. oven for 20 minutes, a paint film was obtained.

Colorimetry was performed on this paint film using a light source of D65 and a view angle of 10 degrees by means of a Spectraflash 500 spectrophotometer manufactured by Datacolor International Company, the hue angle H and chroma C* were calculated, and the results are shown in Table 1.

Applied Examples 2~8

In the same way as in Applied Example 1, with the exception of using the δ-indanthrone blue pigments obtained in Examples 2~8, respectively, in place of the δ-indanthrone blue pigment obtained in Example 1, δ-indanthrone pigment dispersion films were obtained.

For the δ-indanthrone pigment dispersion films obtained in this way, the hue angle H and chroma C* were calculated in the same way as in Applied Example 1, and the results have been displayed in Table 1.

Comparative Applied Examples 1~3

In the same way as in Applied Example 1, with the exception of using the δ-indanthrone blue pigments obtained in Comparative Examples 1~2 (Comparative Applied Examples 1~2) and α-indanthrone blue pigment (Monolite Blue 3R manufactured by Zeneka Colors.; Comparative Applied Example 3), respectively, in place of the δ-indanthrone blue pigment obtained in Example 1, δ-indanthrone pigment dispersion films were obtained.

For the indanthrone pigment dispersion films obtained in this way, the hue angle H and chroma C* were calculated in the same way as in Applied Example 1, and the results have been displayed in Table 1.

TABLE 1

| | Pigment used | Average linear particle diameter (μm) | L* | C* | H |
|---|---|---|---|---|---|
| Applied Example 2 | Example 1 | 0.035 | 57.2 | 26.7 | 278 |
| Applied Example 2 | Example 2 | 0.028 | 56.9 | 27.0 | 278 |
| Applied Example 3 | Example 3 | 0.030 | 56.9 | 27.0 | 278 |
| Applied Example 4 | Example 4 | 0.030 | 55.9 | 31.6 | 281 |
| Applied Example 5 | Example 5 | 0.50 | 63.9 | 20.5 | 274 |
| Comparative Applied Example 1 | Comparative Example 1 | 2.5 | 67.7 | 16.1 | 271 |
| Comparative Applied Example 2 | Comparative Example 2 | 0.72 | 67.0 | 17.9 | 272 |
| Comparative Applied Example 3 | α type | 0.065 | 56.7 | 31.3 | 265 |
| Applied Example 6 | Example 6 | 0.033 | 56.7 | 28.7 | 279 |
| Applied Example 7 | Example 7 | 0.034 | 58.8 | 27.1 | 278 |
| Applied Example 8 | Example 8 | 0.032 | 57.3 | 27.7 | 278 |

In Table 1, L* means in CIE color a system value, C* means a chroma, and H means hue angle.

The following are made clear by the results shown in Table 1.

(1) The δ-indanthrone blue pigment dispersion paint films obtained in Applied Examples 1-8 have larger hue angles H, have hues of extremely more reddish blue color, and have more beautiful external appearances than the conventional α-indanthrone blue pigment dispersion film obtained in Comparative Applied Example 3

(2) The δ-indanthrone blue pigment dispersion paint film obtained in Comparative Applied Example 1 is grayish blue and has a hue which cannot at all be regarded as a pigment.

(3) Since the δ-indanthrone blue pigment dispersion paint film obtained in Comparative Applied Example 2, in comparison with the conventional α-indanthrone blue pigment dispersion film obtained in Comparative Applied Example 3, has a larger hue angle H, its reddishness is emphasized, however, because the chroma C* is low, it has a blue gray color, and it does not have the beautiful external appearance or the reddish blue color which is the object of this invention.

(4) The conventional α-indanthrone blue pigment dispersion film obtained in Comparative Applied Example 3 has a smaller hue angle H, and its hue is a greener blue than the δ-indanthrone pigment dispersion paint films from each of the Applied Examples.

From these, it is clear that the δ-indanthrone blue pigments which express a hue of the desired strong reddish blue color has the hue angle of the range of 274-283 and the chroma C* is 20 or greater. Moreover, it is also clear that the average primary particle diameter of the δ-indanthrone blue pigments which satisfy these conditions is 0.5 μm or less.

Applied Examples 9-11

5 parts of the each of the δ-indanthrone blue pigments obtained in Examples 6, 7, and 8, and 40 parts of xylene were measured and put into 100 ml glass bottles which were then sealed shut, and left for 7 days in a constant temperature bath at 50° C.

Even under these severe conditions, the crystal form of these pigments did not change, therefore making it possible to confirm that these pigments were extremely stable in δ-form.

Comparative Applied Example 4

With the exception of using the δ-indanthrone blue pigment obtained in Example 2 in place of the δ-indanthrone blue pigment obtained in Example 6, a crystalline stability test was conducted in the same way as in Applied Example 9.

Under these severe conditions, these pigments, without any surface treatment, changed crystal form to α-form, and therefore lack stability.

Applied Example 12

10.0 parts of the δ-indanthrone blue pigment obtained in Example 1, 157.5 parts of acrylic melamine resin for paint use (a mixture of ACRYDIC 47-712/Super BECKAMINE L-117-60 ratio=4/1 solid parts by weight, manufactured by DAINIPPON INK CHEMICALS, INC.), 32.5 parts of xylene/n-butanol (ratio of 3/1 by weight) and 150 parts by weight of 3 mm diameter glass beads were put into a dispersion vessel, and dispersed using a bead mill, and a dispersion enamel paint of δ-indanthrone blue pigment was obtained.

This dispersion enamel paint of δ-indanthrone blue pigment was put in a 50° C. constant temperature bath and left for 10 days, and a test of its stability as a coloring material conducted.

This paint had no crystalline change or remarkable color change, and, as a paint, was sufficiently stable, therefore this δ-indanthrone blue pigment can be used as a coloring material.

With the exception of using 10 parts of ALPASTE 7620NS (manufactured by Toyo Aluminum Co.) in place of δ-indanthrone blue pigment, a dispersed aluminum enamel paint was manufactured having the same formation as the paint of δ-indanthrone blue pigment.

Next, a metallic base paint was manufactured by mixing 50 parts of the dispersion enamel paint manufactured above with 50 parts of the aluminum enamel paint of δ-indanthrone blue pigment.

The above-mentioned metallic base paint and a clear paint (a mixture of ACRYDIC A-310/Super BECKAMINE L-117-60 at a ratio=7/3 solid parts by weight, manufactured by DAINIPPON INK & CHEMICALS, INC.) were air-sprayed to a metallic panel by means of a 2 coat 1 bake method, and bake dried in a 140° C. oven for 20 minutes. After drying, a δ-indanthrone blue pigment dispersion metallic paint panel was obtained. The colorimetry results for this paint panel are shown in Table 2.

Next, an outside exposure test was conducted on this paint panel for 2 years (under exposure conditions of facing south at 45° at the Kashima Factory of DAINIPPON INK & CHEMICALS, INC.). The color differences for the paint panel before the exposure test and after the exposure test are shown in Table 3.

Comparative Applied Example 5

With the exception of using α-indanthrone blue pigment (Monolite Blue 3R manufactured by Zeneka Colors) in place of the δ-indanthrone blue pigment in Applied Example 12, in the same way as in Applied Example 12, a paint is manufactured, and a paint panel is obtained. The results of colorimetry for that paint panel are shown in Table 2.

Next, in the same way as in Applied Example 12, an outside exposure test was conducted on this paint panel for 1 year at the Kashima Factory of DAINIPPON INK & CHEMICALS, INC. The color difference ΔE* for the paint film before the exposure test and after the exposure test is shown in Table 3.

TABLE 2

|  | L* | a* | b* | c* | H |
|---|---|---|---|---|---|
| Applied Example 12 | 44.1 | 5.2 | −27.7 | 28.2 | 281 |
| Comparative Applied Example 5 | 45.5 | 0.5 | −29.2 | 29.2 | 271 |

In Table 2, L*, a*, and b* mean in CIE color a system value, C* means chroma, and H means hue angle.

From the results shown in Table 2, the paint film which used the δ-indanthrone blue pigment has a larger hue angle H, has a hue of an extremely more reddish blue color, and shows a more beautiful external appearance than the paint film which used the conventional α-indanthrone blue pigment. On the other hand, the paint film which used the conventional α-indanthrone blue pigment has a smaller hue angle H, and its hue is a greener blue than the paint film which used the δ-indanthrone blue pigment.

TABLE 3

|  | Color difference ΔE* |
|---|---|
| Applied Example 12 | 1.3 |
| Comparative Applied Example 5 | 4.1 |

From the results shown in Table 3, for the paint panel which used the δ-indanthrone blue pigment, the value for color difference is smaller than that for the paint panel which used the conventional α-indanthrone blue pigment, and it can be understood that the δ-indanthrone blue pigment provides enduring weather resistance for automobile paint.

Applied Example 13

1 part of the δ-indanthrone blue pigment obtained in Example 1 and 1.5 parts of dioctyl phthalate were dispersed at a pressure of 150 pounds by a Hoover automatic muller, spun 300 times, thereby manufacturing toner for polyvinyl chloride.

Next, 0.5 parts of this toner, 4.0 parts of polyvinyl chloride white masterpatch (manufactured by DAINIPPON INK & CHEMICALS, INC.), and 100 parts of polyvinyl chloride compound ("Vynica compound C982 Clear" manufactured by Mitsubishi Chemicals MKV Co.) were milled for 3 minutes at 150° C. using a heated two-roll-mill, thereby manufacturing a milled polyvinyl chloride sheet with a pigment component of 0.2%, and a ratio of pigment to titanium dioxide of 1 to 10. A polyvinyl chloride sheet was made by pressing this milled sheet for 3 minutes with heat.

The results of colorimetry for this polyvinyl chloride sheet of δ-indanthrone blue pigment dispersion is shown in Table 4.

Comparative Applied Example 6

A polyvinyl chloride sheet was manufactured in the same way as in Applied Example 13 with the exception that α-indanthrone blue pigment (Monolite Blue 3R manufactured by Zeneka Colors) was used in place of the δ-indanthrone blue pigment.

The results of colorimetry for this polyvinyl chloride sheet of a α-indanthrone blue pigment dispersion are shown in Table 4.

TABLE 4

|  | L* | a* | b* | c* | H |
|---|---|---|---|---|---|
| Applied Example 13 | 56.8 | 4.5 | −27.3 | 27.7 | 279 |
| Comparative Applied Example 6 | 52.6 | −0.3 | −35.4 | 35.4 | 269 |

In Table 4, L*, a*, and b* mean in CIE color a system value, C* means chroma, and H means hue angel.

From the results shown in Table 4, it can be understood that the polyvinyl chloride sheet of a δ-indanthrone blue pigment dispersion has a redder hue than that of the sheet which used α-indanthrone blue pigment. It can be understood that the δ-indanthrone blue pigment can be satisfactorily used as a coloring material, because it has similar heat resistance as the conventional α-indanthrone blue pigment.

Applied Example 14

A panel coated with the paint film obtained in Applied Example 12 was subjected to an accelerated exposure test for 144 hours using an Eye Super UV tester (manufactured by Iwasaki Denki Co.), and the color difference ΔE* for the paint film before the exposure test and after the exposure test is shown in Table 5.

Comparative Applied Example 7

A metallic panel coated with the paint film obtained in the same way as in Applied Example 12 with the exception that 5 parts of copper phthalocyanine pigment (C. I. Pigment Blue 15:2) and 5 parts of dioxazine violet pigment (C. I. Pigment Violet 23) were used in place of the δ-indanthrone blue pigment obtained in Example 1.

The panel coated with the paint film obtained in Comparative Applied Example 7 was subjected to an accelerated exposure test for 144 hours in the same way as in Applied Example 14, the color difference ΔE* for the paint film before the exposure test and after the exposure test is shown in Table 5.

TABLE 5

|  | Color difference ΔE* |
|---|---|
| Applied Example 14 | 0.83 |
| Comparative Applied Example 7 | 1.47 |

From the results in Table 5, it can be understood that the color difference of the exposure test for the paint film made by combining the phthalocyanine blue and dioxazine violet was large, and that the paint film is inferior in weather resistance when compared with the paint film which used the δ-indanthrone blue pigment of the present invention.

Results of the Invention

The δ-indanthrone blue pigment of the present invention has an extremely reddish blue color, and is superior in stability, weather resistance, and dispersability.

What is claimed is:

1. A δ-indanthrone blue pigment having an average primary particle diameter of not more than 0.5 μm.

2. A δ-indanthrone blue pigment having a chroma C* value of 20 or greater; a hue angle in the range of 274–283 when colorimetry is performed on a paint film made from a melamine alkyd paint in which the proportion of pigment in the solid portion is 9.6%; and containing δ-indanthrone blue pigment and titanium dioxide pigment in a ratio of 1 to 20 by weight.

3. A δ-indanthrone blue pigment having a chroma C* value of 20 or greater; a hue angle in the range of 274–281 when colorimetry is performed on a paint film made from a melamine alkyd paint in which the proportion of pigment in the solid portion is 9.6%; and containing δ-indanthrone blue pigment and titanium dioxide pigment in a ratio of 1 to 20 by weight.

4. A δ-indanthrone blue pigment according to claim 2 having a hue angle H in the range of 275–281, and a chroma C* value of 24 or greater.

5. A δ-indanthrone blue pigment according to one of claims 1–4, containing 60% or greater of an indanthrone blue represented by the general formula:

wherein $X^1$, $X^2$, $X^3$, and $X^4$ each respectively represents a hydrogen atom or a halogen atom.

6. A pigment dispersion made by dispersing a δ-indanthrone blue pigment according to one of claims 1–4 in a polymer material.

7. A manufacturing method for δ-indanthrone blue according to one of claims 1–4, comprising oxidation of a reduced product by addition of said reduced product to an oxidizing solution comprising an oxidizing agent and a solvent by stirring, wherein the reduced product has a skeleton represented by the general formula:

wherein $X^1$, $X^2$, $X^3$, and $X^4$ each independently represents a hydrogen atom or a halogen atom.

8. A manufacturing method for a δ-indanthrone blue pigment according to claim 7 using an alkaline aqueous solution of a reducing electric potential of −700 mV or less, a reduction in the alkaline aqueous solution occurring in the range of 40°–100° C.

9. A manufacturing method for a δ-indanthrone blue pigment comprising wet-milling the δ-indanthrone blue pigment which is obtained by reduction of a compound having the skeleton recited in claim 7, and oxidation of the reduction product by addition of said reduced product to an oxidizing solution comprising an oxidizing agent and a solvent while stirring.

10. A manufacturing method for a δ-indanthrone blue pigment according to claim 9, wherein wet-milling is performed in an organic solvent, water, or a mixture of organic solvent and water.

11. A manufacturing method for a δ-indanthrone blue pigment according to claim 9, comprising the addition of an organic pigment derivative having a halogen group, phthalimide group, dialkylaminomethyl group, a sulfonic acid amide group, a sulfonic acid amine salt group, or a sulfonic acid metallic salt when wet milling.

12. A manufacturing method for a δ-indanthrone blue pigment according to claim 10, comprising the addition of an organic pigment derivative having a halogen group, phthalimide group, dialkylaminomethyl group, a sulfonic acid amide group, a sulfonic acid amine salt group, or a sulfonic acid metallic salt when wet-milling.

13. A manufacturing method for a δ-indanthrone blue pigment according to claim 9, comprising the addition of a polymer dispersant when wet-milling.

14. A manufacturing method for a δ-indanthrone blue pigment according to claim 10, comprising the addition of a polymer dispersant when wet-milling.

15. A manufacturing method for a δ-indanthrone blue pigment as recited in claim 11, comprising the addition of a polymer dispersant when wet-milling.

16. A manufacturing method for a δ-indanthrone blue pigment as recited in claim 12, comprising the addition of a polymer dispersant when wet-milling.

* * * * *